United States Patent
Murphy et al.

(10) Patent No.: US 6,246,936 B1
(45) Date of Patent: Jun. 12, 2001

(54) VEHICLE OCCUPANT CHARACTERIZATION METHOD BASED ON SENSED OCCUPANT WEIGHT

(75) Inventors: Morgan Daniel Murphy; Pamela Ann Roe, both of Kokomo; Peter Alan Thayer, Noblesville; Douglas Allen Nunan, Kokomo; Phillip E Kaltenbacher, II, Lafayette; Duane Donald Fortune, Lebanon; Chiutsun Albert Lee, Kokomo; Charles A. Gray, Noblesville; Stuart Stites Sullivan, Peru; David R. Little, Kokomo, all of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/412,936

(22) Filed: Oct. 5, 1999

(51) Int. Cl.$^7$ ........................................ G06F 17/00
(52) U.S. Cl. ................. 701/45; 280/735; 280/801.1
(58) Field of Search .................... 280/734, 735, 280/801.1, 802; 701/35, 45, 46, 47; 180/271, 282, 268, 273; 177/209; 297/DIG. 3, 452.41, 195.12, 284.6; 340/436, 666, 665, 667

(56) References Cited

U.S. PATENT DOCUMENTS

| | | | |
|---|---|---|---|
| 5,957,491 | | 9/1999 | Cech et al. ............................ 280/735 |
| 6,058,341 | * | 5/2000 | Myers et al. .......................... 280/735 |
| 6,089,106 | * | 7/2000 | Patel et al. ............................ 280/735 |
| 6,099,032 | * | 8/2000 | Cuddihg et al. ...................... 280/735 |
| 6,101,436 | * | 8/2000 | Fortune et al. ....................... 280/735 |
| 6,161,070 | * | 12/2000 | Finno et al. ............................ 701/45 |

FOREIGN PATENT DOCUMENTS

49706 * 6/1992 (JP) ...................................... 701/45

* cited by examiner

Primary Examiner—Richard M. Camby
(74) Attorney, Agent, or Firm—Jimmy L. Funke

(57) ABSTRACT

An improved weight-based occupant characterization method that can inexpensively and reliably distinguish between a child or small adult and a tightly cinched child seat. When the sensed weight is in a specified range that could be produced by a tightly cinched child seat, the system characterizes the occupant based on a detected variation in sensed weight during movement of the vehicle. If the variance of the sensed weight is below a threshold for a predetermined interval, the occupant is characterized as a child seat, since a tightly cinched seat belt severely restricts variance. If the variance exceeds the threshold for a predetermined interval, the occupant is characterized as a child or small adult. A correlative factor that can be used in distinguishing between a child seat and a child or small adult is determined by computing a slope reversal rate, or frequency, of the measured weight. In this case, a child seat is indicated by the combination of low variance and a high frequency, whereas a child or small adult is indicated by the combination of high variance and a low frequency. Additionally, movement of the vehicle can be detected when the variance of the sensed weight is within a predetermined range for at least a predetermined interval.

14 Claims, 7 Drawing Sheets

VEHICLE OCCUPANT CHARACTERIZATION METHOD BASED ON SENSED OCCUPANT WEIGHT

TECHNICAL FIELD

This invention relates to a method of characterizing the occupant of a motor vehicle for purposes of enabling or disabling air bag deployment based on sensed occupant weight, and more particularly to a method of distinguishing a cinched child seat from an occupant of similar apparent weight.

BACKGROUND OF THE INVENTION

Vehicle occupant weight detection systems are useful in connection with air bags and other pyrotechnically deployed restraints as a means of characterizing the occupant for purposes of determining whether to enable or disable deployment of the restraints. For example, it is generally desired to enable deployment for adult-weight occupants, and to disable deployment (or reduce deployment force) for child-weight occupants. In the case of infant or child seats (referred to herein collectively as child seats) that are placed on the vehicle seat and cinched down with a seat belt, it is generally believed that deployment should be disabled entirely. Unfortunately, there can be some ambiguity in the case of a child seat, particularly if the seat belt restraining the child seat is cinched very tightly, as a tightly cinched child seat can produce a weight reading similar to that of a small adult.

Accordingly, various attempts have been made to distinguish a child seat from other occupants producing a similar weight reading. In certain systems, for example, a special tag is affixed to the child seat for detection by a sensor located in the seat back or instrument panel. It has also been proposed to measure the seat belt restraining force to determine if a significant portion of the sensed weight is due to a cinched seat belt. However, both of these approaches are difficult to implement in an inexpensive and reliable manner.

SUMMARY OF THE INVENTION

The present invention is directed to an improved weight-based occupant characterization method that can inexpensively and reliably distinguish between a child or small adult and a tightly cinched child seat. When the sensed weight is in a specified range that could be produced by a tightly cinched child seat, the system characterizes the occupant based on a detected variation in sensed weight during movement of the vehicle. If the variance of the sensed weight is below a threshold for a predetermined interval, the occupant is characterized as a child seat, since a tightly cinched seat belt severely restricts variance. If the variance exceeds the threshold for a predetermined interval, the occupant is characterized as a child or small adult. A correlative factor that can be used in distinguishing between a child seat and a child or small adult is determined by computing a slope reversal rate, or frequency, of the measured weight. In this case, a child seat is indicated by the combination of low variance and a high frequency, whereas a child or small adult is indicated by the combination of high variance and a low frequency. Additionally, movement of the vehicle can be detected when the variance of the sensed weight is within a predetermined range for at least a predetermined interval.

DESCRIPTION OF THE PREFERRED EMBODIMENT

The present invention is disclosed in the context of an occupant weight estimation system 10 based on the fluid pressure in a seat cushion bladder 20. In general, however, the present invention applies to other types of weight based systems as well, such as systems that sense the strain in a seat frame element, or systems that include a network of pressure sensitive cells distributed over the seating area.

Figure 1:
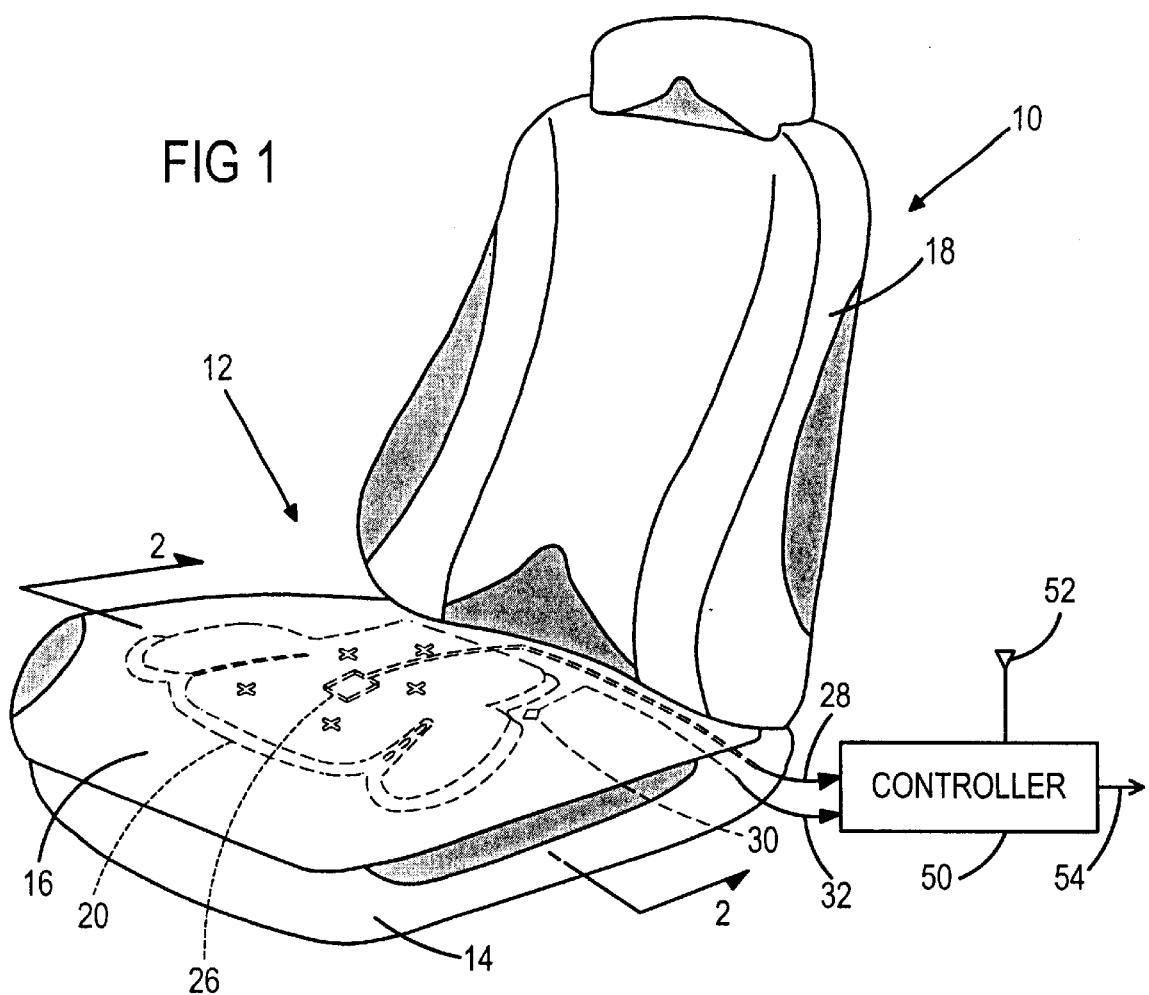
FIG. 1 is a system diagram illustrating a passenger seat of a vehicle equipped with a fluid-filled bladder and a controller for estimating the weight of a seat occupant and characterizing the occupant based on the estimated weight in accordance with this invention.
Figure 2:
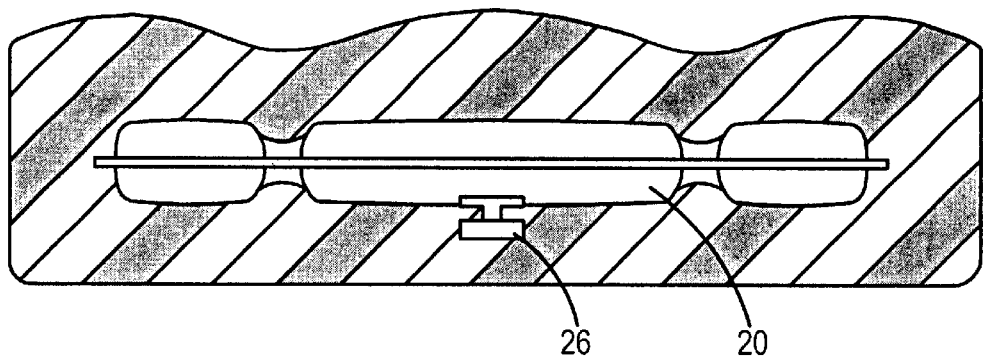
FIG. 2 is a cross-section view of the foam seat cushion and fluid-filled bladder of FIG. 1.

Referring to FIGS. 1–2, the vehicle seat 12 is supported on a frame 14, and includes foam cushions 16 and 18 on the seat bottom and back. The bladder 20 is disposed in or under the foam cushion 16 substantially parallel with the central seating surface, and preferably contains a fluid such as silicone which is non-corrosive, and not subject to freezing at extreme ambient temperatures. The bladder 20 is coupled to a pressure sensor 26, which provides an electrical output signal on line 28 indicative of the fluid pressure in the bladder 20. A temperature sensor 30 located in proximity to the bladder 20 provides an electrical output signal on line 32 indicative of the bladder and foam temperature. The sensor 30 can be provided as a separate sensor as indicated in FIG. 1, or may be integrated with the pressure sensor 26.

The electrical pressure and temperature signals on lines 28 and 32 are provided as inputs to a controller 50, which characterizes the occupant for purposes of determining if an air bag of a supplemental restraint system (not shown) should be enabled or disabled. This involves estimating the weight of the occupant based on the pressure and temperature signals, and analyzing the pressure signal to distinguish between a cinched child seat and a child or small adult. Thus, the output on line 54 is simply a deployment status indication based on the occupant characterization. In general, deployment is enabled when the system detects an adult or child occupant, and disabled when the system detects a cinched child seat, a small child, or no occupant. The controller 50 is mechanized with a suitably programmed microprocessor, as described below in reference to FIGS. 3–9.

The bladder fluid has a nominal or unloaded pressure that increases monotonically with occupant weight applied to the cushion 16. The temperature measurement is used to compensate the weight or pressure measurement for corresponding changes in foam and bladder stiffness at temperature extremes. Preferably, the pressure sensor 26 is configured to sense the differential or gage pressure of the fluid—that is, the pressure difference between atmospheric pressure and bladder fluid pressure—in order to provide a pressure measurement that is insensitive to atmospheric pressure variations due to changing weather patterns or altitude. In this case, the sensor 26 includes a second inlet (not shown) open to atmospheric pressure. Alternately, the sensor 26 may provide an absolute pressure measurement of the bladder fluid, and the controller 50 may compensate the measurement for atmospheric pressure variations by reducing the fluid pressure measurement by an atmospheric pressure measurement provided by sensor 52. To minimize sensitivity to changes in the orientation of the bladder 20 due to roll or fore-aft pitching of the vehicle, the sensor 26 is preferably configured so as to sense the fluid pressure at the center of gravity of bladder 20.

Figure 3:
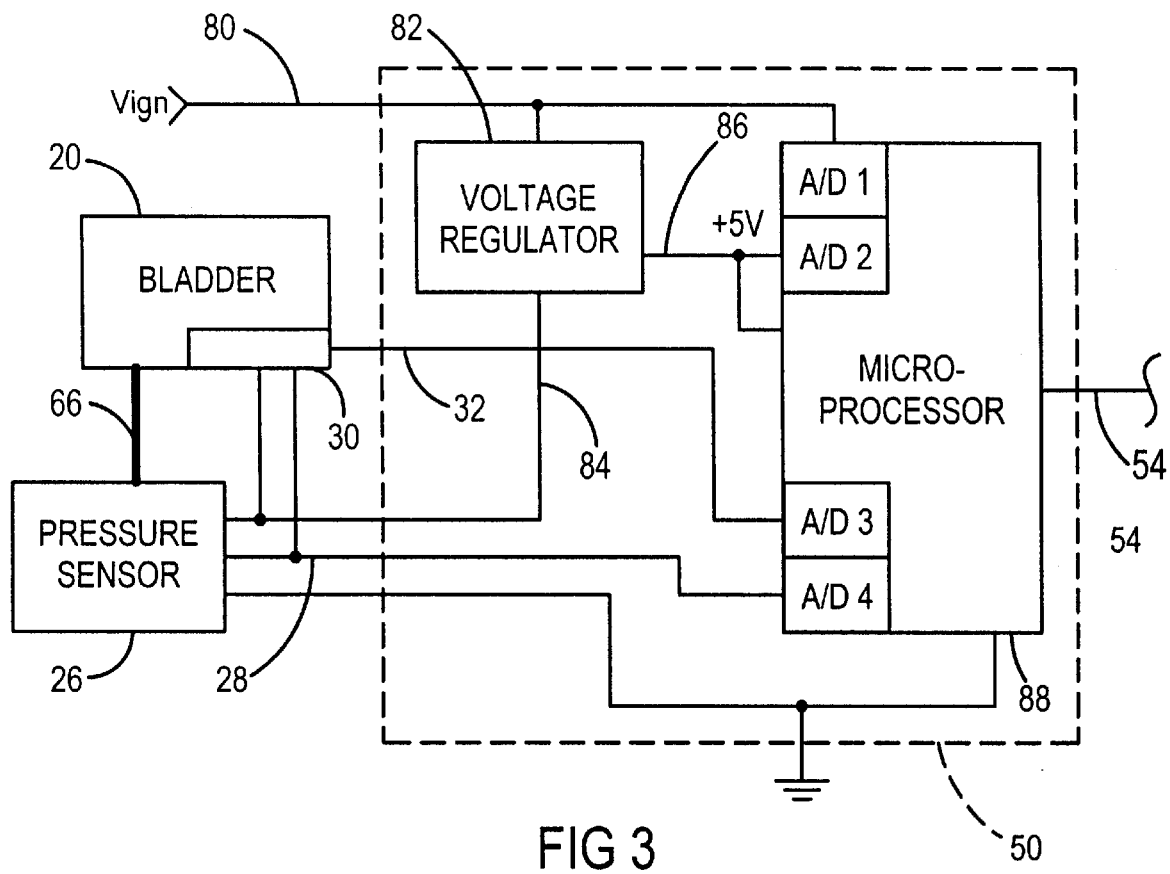
FIG. 3 is a block diagram of the controller of FIG. 1, in the context of an air bag deployment system.

FIG. 3 depicts a block diagram of the controller 50. Vehicle ignition voltage Vign, which may be +12 VDC, is supplied to controller 50 via line 80, and an internal voltage regulator 82 provides a regulated system voltage of +5 VDC on lines 84 and 86. The system and ground voltages are supplied to source voltage terminals of the pressure sensor 26, the temperature sensor 30 (which may be a thermistor), and a microprocessor 88. The microprocessor 88 has four analog-to-digital input channels A/D 1–A/D 4 that receive the ignition voltage Vign, the system voltage of voltage regulator 82, the temperature sensor output voltage on line 32, and the pressure sensor output voltage on line 28.

Based on the above-described inputs, the microprocessor 88 determines the occupant weight, and based on predetermined criteria, whether air bag deployment should be inhibited or allowed. The relationship between occupant weight and the sensed pressure is empirically determined at a variety of temperatures. In a system as suggested in FIGS. 1–2, the data can be used to construct either a mathematical model or a multi-dimensional look-up table of occupant weight as a function of temperature and sensed pressure, with the model or table programmed into the microprocessor and used to determine the occupant weight. If the weight falls into a range that could be produced either by a tightly cinched child seat (for which deployment should be disabled) or a small adult (for which deployment should be enabled), the microprocessor 88 executes a routine for analyzing variations in the sensed pressure to properly characterize the occupant. Essentially, it has been found that there is a significant difference in pressure signal variation, depending on the degree of restraint of the occupant. When the occupant is a normally restrained adult or child, the pressure signal exhibits a high degree of variation during movement of the vehicle, even if the occupant is resting or asleep. When the occupant is a tightly cinched child seat, on the other hand, the pressure signal variation is much lower since a tightly cinched seat belt severely restricts variance. Thus, if the variance of the sensed weight is less than a threshold for a predetermined interval, the occupant is characterized as a child seat, whereas if the variance exceeds a threshold for a predetermined interval, the occupant is characterized as a child or small adult. A correlative factor used in distinguishing between a child seat and a child or small adult is determined by computing a slope reversal rate, or frequency, of the measured weight. In this case, a child seat is indicated by the combination of low variance and a high frequency, whereas a child or small adult is indicated by the combination of high variance and a low frequency. Movement of the vehicle can be detected by a dedicated vehicle or engine speed input, or alternately, by observing the variance of the sensed weight.

FIGS. 4–9 are flow diagrams representative of computer program instructions executed by the microprocessor 88 in carrying out the above-described control. The flow diagram of FIGS. 4A–4B represents a main or executive program, whereas the flow diagrams of FIGS. 5–9 detail various steps of the main program.

Figure 4A:
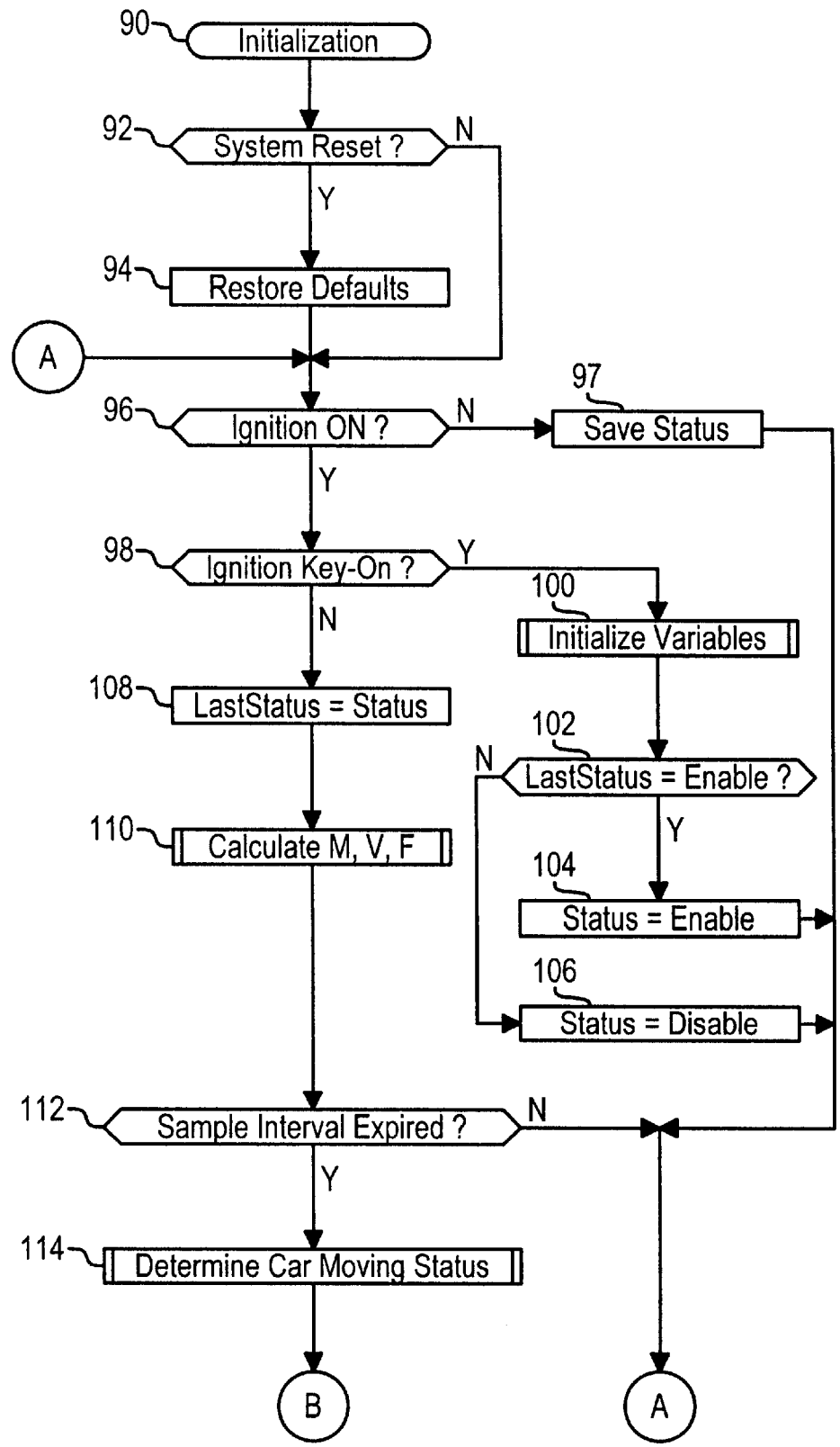
Figure 4B:
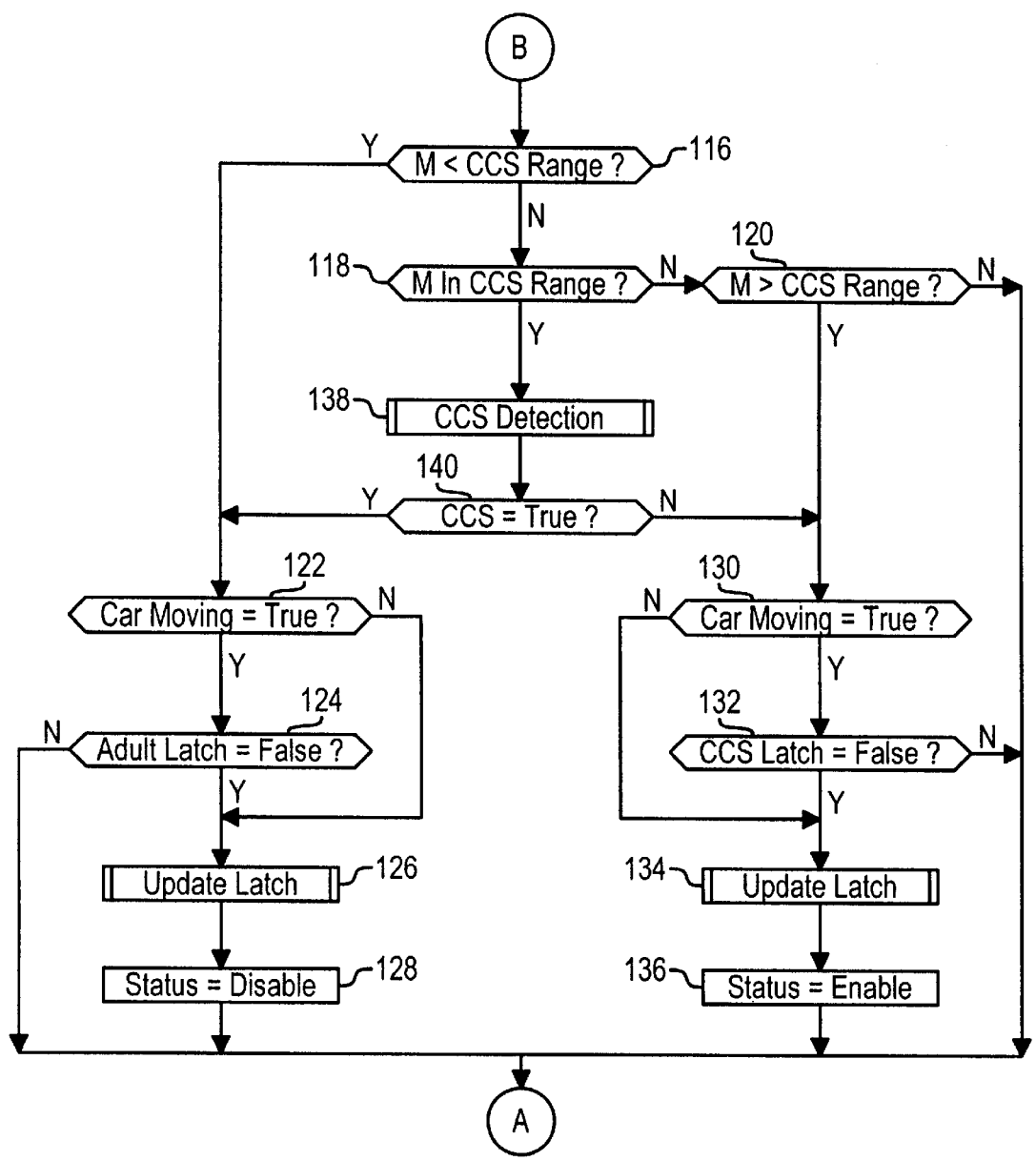

Referring to FIGS. 4A–4B, the block 90 designates a series of program instructions executed at the initiation of each period of vehicle operation. If there has been a system reset, as determined at block 92, the block 94 is executed to restore various default settings before entering the main program loop at block 96. The term Status is the output of the main program loop, and such output is saved from one ignition cycle to the next, as indicated by the blocks 96–97. At key-on, detected by the block 98, the block 100 is executed to initialize a number of variables, as described in further detail below in reference to the flow diagram of FIG. 5. Following variable initialization, the block 102 determines if LastStatus (that is, the value of Status at the end of the prior ignition cycle) was set to enable deployment. If so, the current value of Status is set to Enable, as indicated at block 104; otherwise, the current value of status is set to Disable, as indicated at block 106. In subsequent execution of the program loop, the block 98 is answered in the negative, and the blocks 108–110 are executed to update the value of LastStatus, and to compute the mean (M), variance (V) and frequency (F) of the pressure signal. The steps of blocks 108–110 are periodically repeated for a Sample Interval, the expiration of which is detected by the block 112; the duration of the Sample Interval may be approximately two seconds, for example. Once block 112 is answered in the affirmative, the block 114 is executed to determine whether the vehicle is moving, as indicated by the value of the term Car Moving Status. The value of Car Moving Status may be determined directly if a vehicle speed input or equivalent is available. However, in the illustrated embodiment, the value of Car Moving Status is determined indirectly based on variance of the pressure signal (as detailed below in reference to the flow diagram of FIGS. 6A–6B), and a speed input is not required.

The blocks 116–120 compare the mean pressure signal M to a pressure signal range (CCS Range) that could possibly occur due to a tightly cinched infant child seat. If the mean M is below the range, only a light weight is sensed, and the blocks 122, 124, 126 and 128 are executed to determine whether Status should be set to Disable, based on Car Moving Status and an Adult Latch term. The Adult Latch term is updated at block 126, and is described in further detail below in reference to the flow diagram of FIG. 9. Essentially, Status is set to Disable if the car is not moving, or if the car is moving and the Adult Latch is not set. As explained below in reference to the flow diagram of FIG. 9, the Latch terms are utilized to indicate a confidence in a respective condition based on consistent measurements taken over a period of time, allowing the controller 50 to disregard or discount measurement taken during transient conditions. If the mean M is above the CCS range, a heavy weight is sensed, and the blocks 130, 132, 134 and 136 are executed to determine whether Status should be set to Enable, based on Car Moving Status and a CCS Latch term. The CCS Latch term is updated at block 134, as described below in reference to the flow diagram of FIG. 9. Essentially, Status is set to Enable if the car is not moving, or if the car is moving and the CCS Latch is not set. If the mean pressure M is in the CCS Range, as determined at block 118, block 138 is executed to determine if the occupant is a tightly cinched infant child seat; such determination is based on the variance and frequency calculations of block 110, and is described in detail below in reference to the flow diagram of FIG. 8. If the cinched child seat (CCS) status output of block 138 is True, as determined at block 140, the blocks 122–128 are executed as described above. If the CCS output of block 138 is False, the blocks 130–136 are executed as described above.

Figure 5:
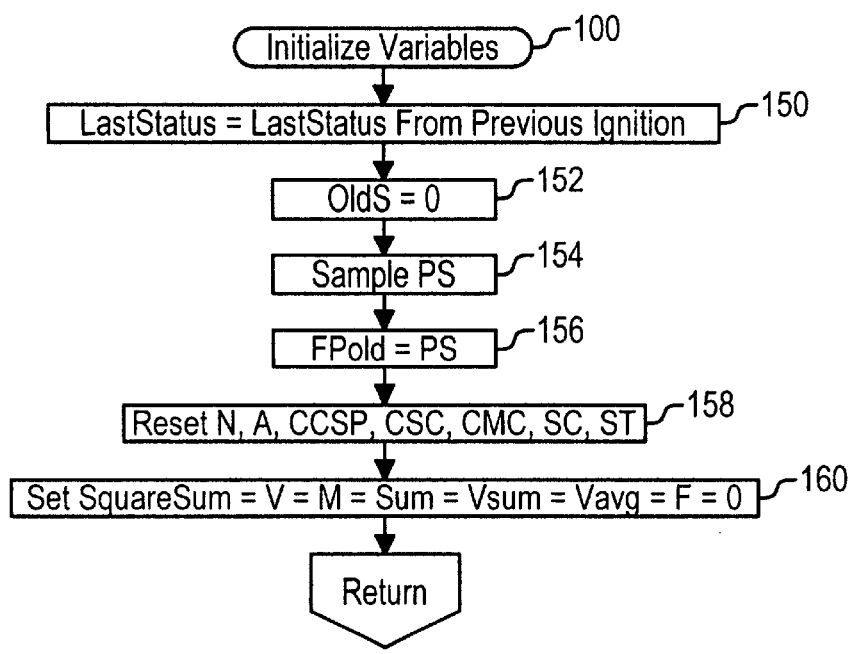
FIGS. 4A, 4B, 5, 6A, 6B, 7, 8 and 9 are flow charts representative of computer program instructions executed by the controller of FIG. 1 in carrying out the control of this invention.

Referring to FIG. 5, the variable initialization block 100 executed at ignition key-on performs a number of miscellaneous functions. Block 150 updates the value of LastStatus based on the value of LastStatus saved in the previous ignition cycle. Blocks 152–156 initialize "old" variables; block 152 sets the old slope OldS to zero, and blocks 154–156 set the old filtered pressure FPold to the current value of the pressure signal PS. Block 158 resets a number of variables and counters to default values, and block 160 sets a number of computed terms to zero.

Figure 6A:
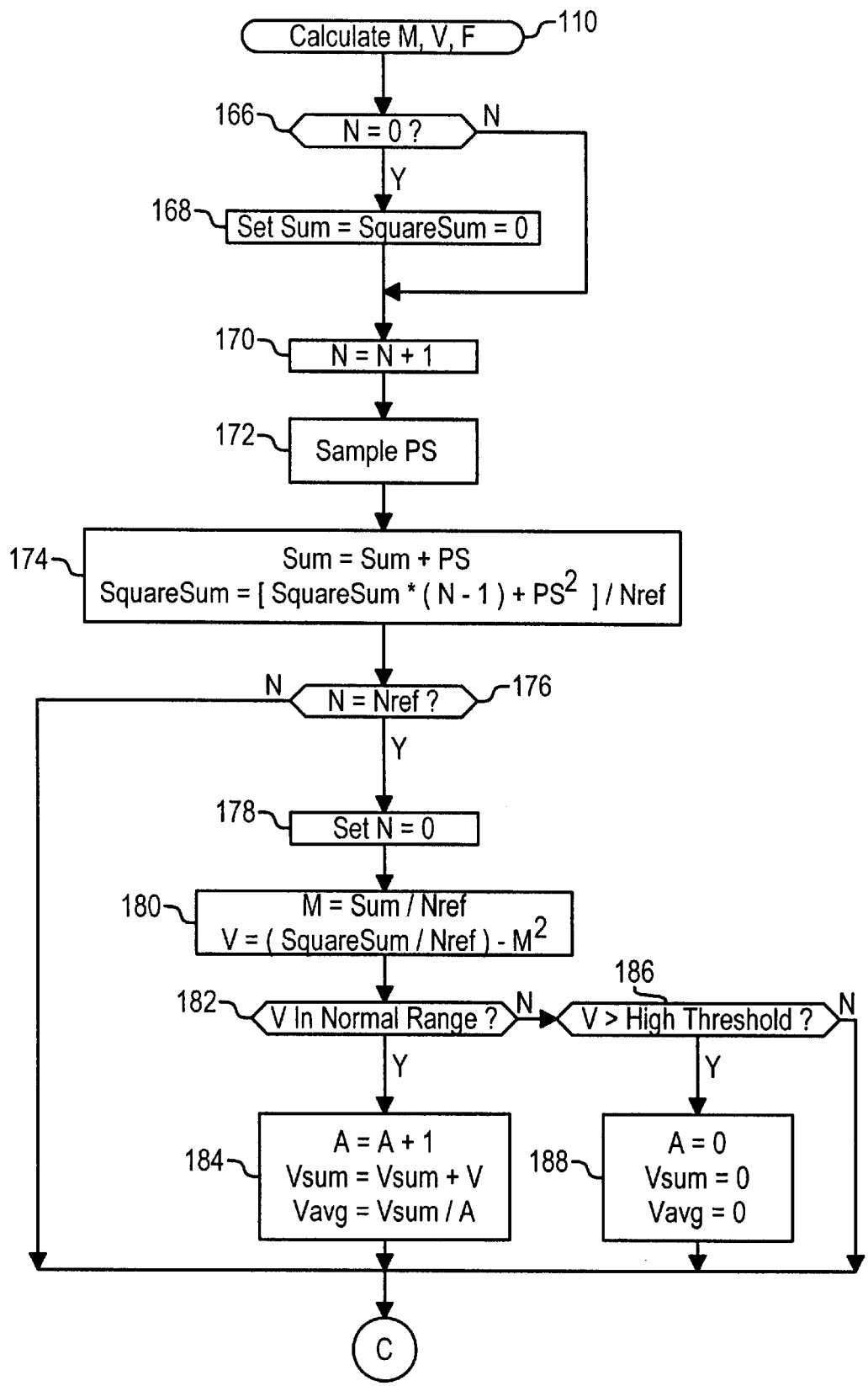
Figure 6B:
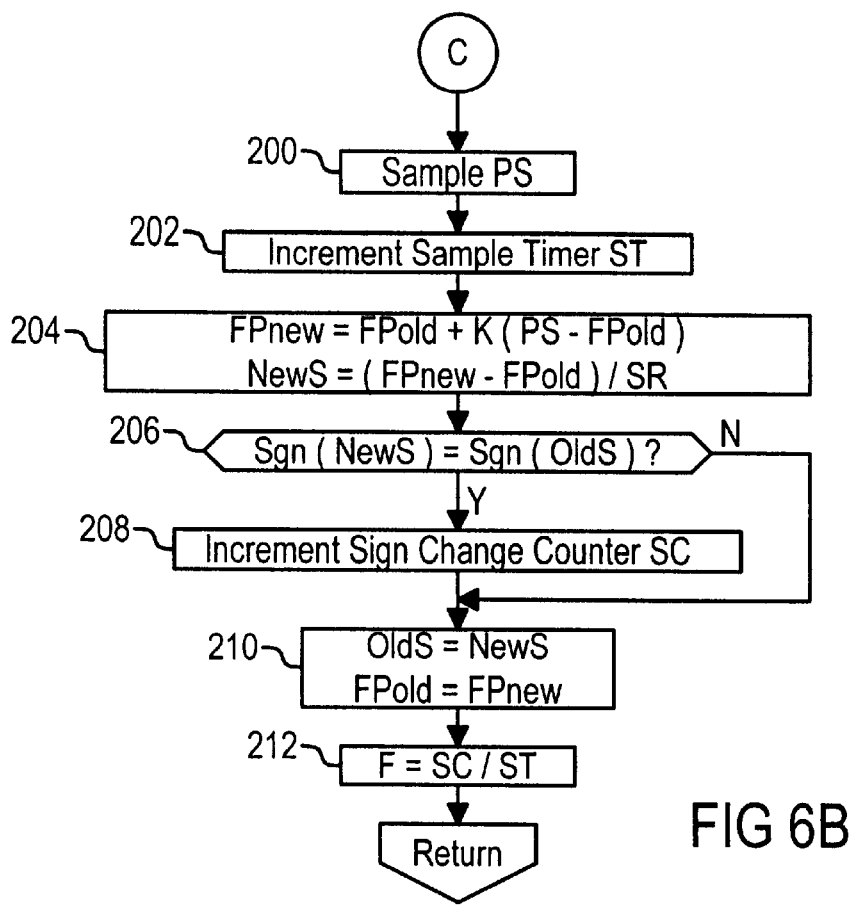

Referring to FIGS. 6A–6B, the calculation block 110 computes a number of terms including the mean pressure signal M, the pressure signal variance V, and the pressure signal frequency F. The mean M and variance V are determined by summing a number (Nref) of pressure signal samples, the term N serving as a sample counter. When N is zero, as determined at block 166, the block 168 is executed to set the terms Sum and SquareSum to zero. Thereafter, block 170 increments N, and block 172 samples the pressure signal PS. As indicated at block 174, the term Sum is a summation of the pressure signal samples, and the term SquareSum is a summation of the squares of the pressure signal samples, divided by Nref. After Nref samples have been taken, as determined at block 176, block 178 resets the term N to zero to set up the next sampling period; by way of illustration, Nref may have a value of 200. Finally, block 180 computes the mean M as Sum/Nref, and the variance V as $[(\text{SquareSum}/\text{Nref})-M^2]$. If the variance V is within a Normal Range, as determined at block 182, the block 184 is executed to determine a running average Vavg of the variance values computed at block 180; the term "A" counts the number of variance values in the average, and the term Vsum is a summation of the variance values. Variance values outside the Normal Range are ignored, unless a High Threshold is exceeded, as determined at block 186; if the High Threshold is exceeded, a transient condition is likely, and the block 188 is executed to reset the terms A, Vsum and Vavg to zero.

The pressure signal frequency F is determined by blocks 200–212 of FIG. 6B by filtering the pressure signal and identifying sign changes in the slope of the filtered signal. The blocks 200–202 sample the pressure signal PS and increment the sample timer ST. Block 204 then updates the filtered pressure signal FPnew and the slope NewS. The filtered pressure signal FPnew is computed as a first-order lag filter, where FPold is the filtered pressure signal before updating and K is a filter constant. The slope NewS is simply computed as the difference (FPnew−FPold) divided by the sample rate SR. If the computed slope changes sign, as determined at block 206, the block 208 increments a Sign Change Counter SC. Block 210 updates the previous values OldS and FPold, and finally, block 212 computes the frequency F according to the ratio SC/ST (that is, the number of slope sign changes per unit time).

Figure 7:
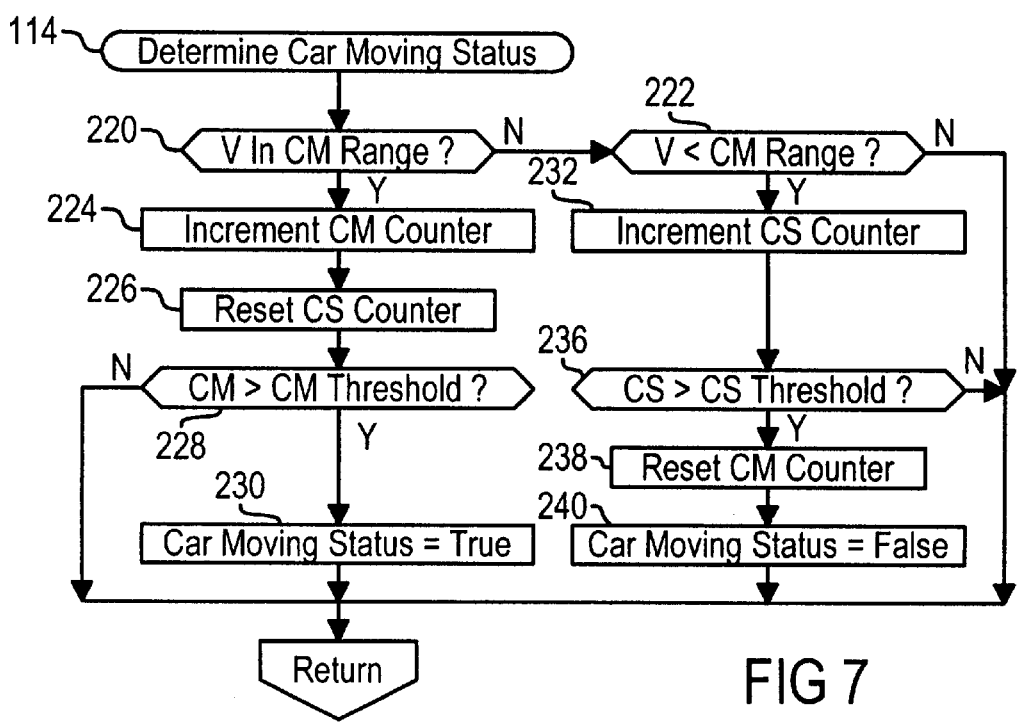

Referring to FIG. 7, the Determine Car Moving Status block 114 determines whether the car is moving based on the time history of the pressure signal variance V. If the variance V is within range referred to as the "car moving" range (CM Range), as determined at block 220, the blocks 224 and 226 increment a "car moving" counter (CM Counter) and reset a "car stationary" counter (CS Counter). If the variance V is lower than the CM Range, as determined at block 222, the block 232 increments the CS Counter. If the variance is within the CM Range and the count CM of the CM Counter exceeds a threshold CM Threshold, as determined by blocks 220 and 228, the block 230 sets the Car Moving Status to True, indicating that the car is moving. On the other hand, if the variance V is lower than the CM Range and the count CS of the CS Counter exceeds a threshold CS Threshold, the blocks 238–240 reset the CM Counter and set the Car Moving Status to False, indicating that the car is not moving. In a mechanization of this invention, the CM Range was defined as being at least 0.0001, but less than 0.1225, the CM Threshold was set to twenty (20), and the CS Threshold was set to two (2). In effect, the Car Moving Status is set to True if the variance V stays within the CM Range for an extended period of time (twenty samples) without falling below the CM Range for more than a short time (two samples).

Figure 8:
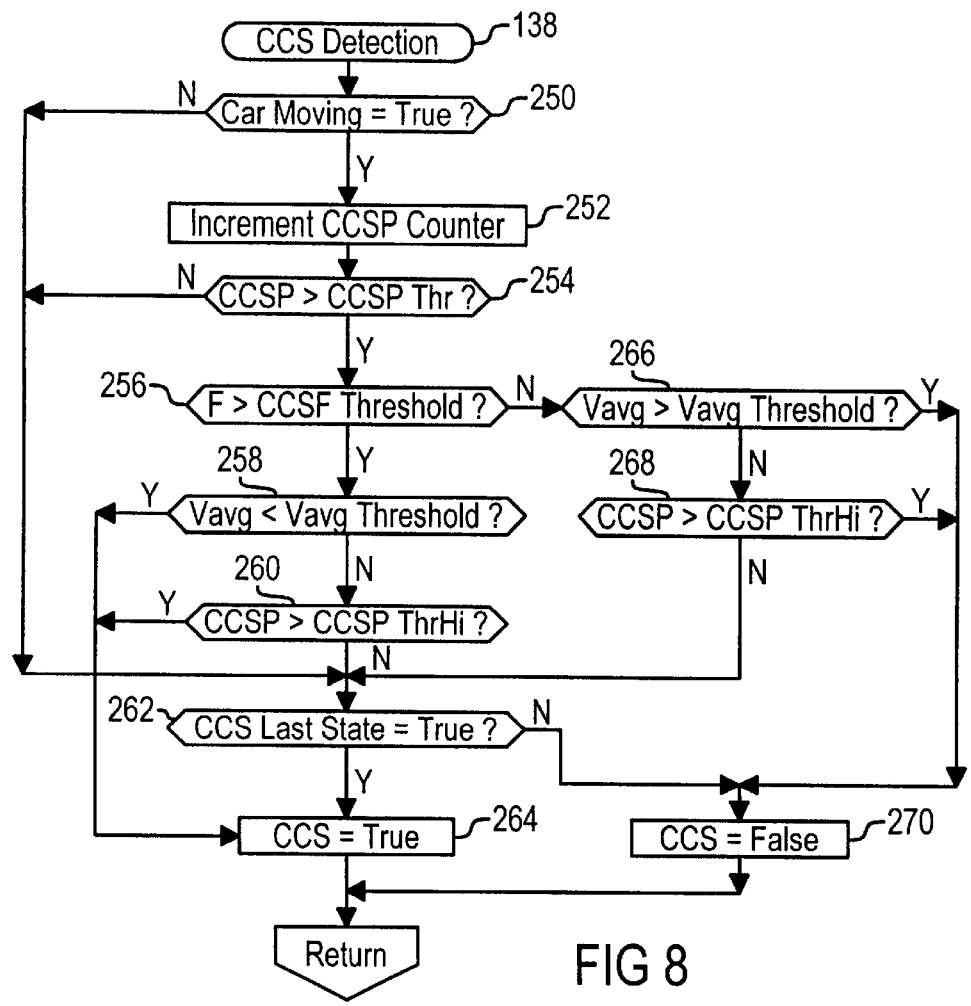

Referring to FIG. 8, the CCS Detection block 138 determines whether a cinched child seat is present based on the time history of the Car Moving Status and the average variance Vavg. If the car is moving, as determined at block 250 by the value of Car Moving Status, the block 252 increments the CCSP (cinched child seat possible) Counter. If the car is not moving or the count CCSP of the CCSP Counter is less than a threshold (CCSP Thr), as determined at blocks 250, 254, the blocks 262, 264, 270 are executed to maintain the CCS Flag in its last state. Once the count CCSP reaches the threshold CCS Threshold (which may be 5, for example), the blocks 256–260 are executed to determine if the CCS flag should be set. Essentially, the CCS Flag is set to indicate the presence of a cinched child seat if the pressure signal frequency F exceeds the CCSF (cinched child seat frequency) Threshold, and the average variance Vavg exceeds a threshold Vavg Threshold or the count CCSP exceeds a high threshold CCSP ThrHi (which may be 10, for example). Thus, the block 264 is executed to set the CCS Flag to True if block 258 or 260 are answered in the affirmative. If the blocks 258 and 260 are answered in the negative, the blocks 262, 264, 270 are executed as described above to maintain the CCS Flag in its last state. If the frequency F is less than CCSF Threshold and the average variance Vavg exceeds Vavg Threshold or the count CCSP exceeds a high threshold CCSP ThrHi, as determined at blocks 256, 266, 268, the block 270 is executed to set the CCS Flag to False, indicating that a cinched child seat is not present. If blocks 256, 266 and 268 are answered in the negative, the blocks 262, 264, 270 are executed as described above to maintain the CCS flag in its last state. To summarize, a cinched child seat is indicated when the CCSP count is above CCSP Thr, F is above a CCSF Threshold, and the average variance Vavg is below Vavg Threshold. Even if Vavg is above Vavg Threshold, a cinched child seat is indicated if the CCSP count is above CCSP ThrHi.

Figure 9:
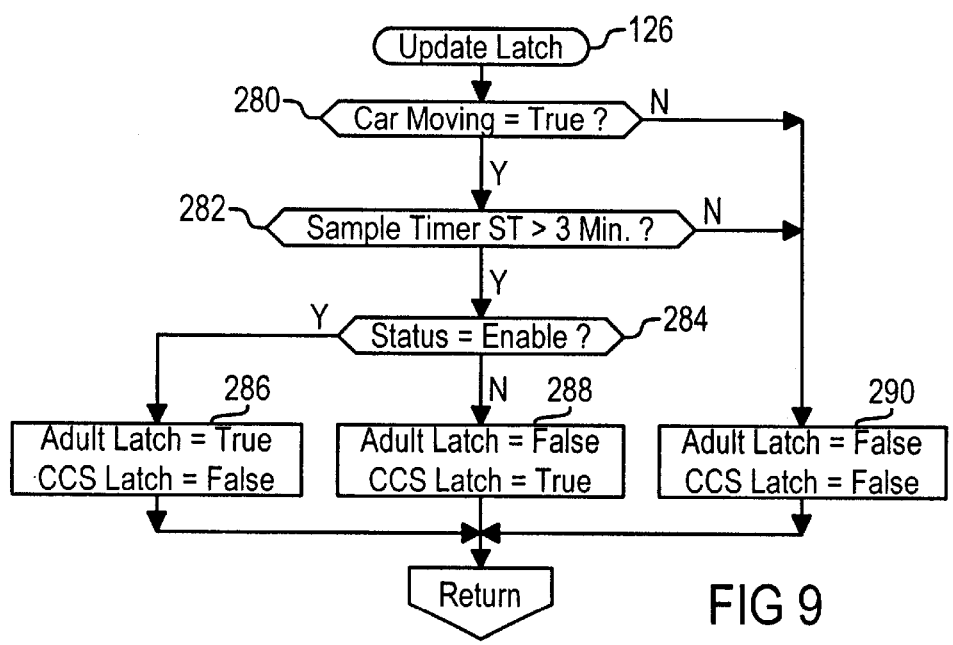

Referring to FIG. 9, the Update Latch block 126 updates the status of the Adult Latch and CCS Latch. As indicated above in reference to FIG. 4B, the block 126 is executed in connection with the execution of blocks 128 and 136. If the car is not moving, as determined by block 280 of FIG. 9, the block 290 is executed to set both the Adult Latch and the CCS Latch to False. The block 290 is likewise executed if the car is moving, but the sample timer ST is not greater than three minutes, as determined by blocks 280, 282. However, if the car is moving and the sample timer ST is greater than three minutes, the block 284 is executed to check the value of Status. If Status is set to Disable, the block 288 sets the Adult Latch to False and the CCS Latch to True. If Status is set to Enable, the block 286 is executed to set the Adult Latch to True and the CCS Latch to False.

In summary, the method of this invention incorporates an inexpensive and reliable technique for characterizing a vehicle occupant for purposes of inhibiting or enabling air bag deployment, and particularly for distinguishing a cinched child seat from an occupant of similar apparent weight. While illustrated in reference to the illustrated embodiment, it is expected that various modifications will occur to persons skilled in the art. For example, this invention is not limited to pressure based bladder systems, and may be applied equally as well to other occupant weight detection systems, as indicated above. Accordingly, it should be understood that occupant characterization methods incorporating such modifications may fall within the scope of this invention, which is defined by the appended claims.

What is claimed is:

1. A method of distinguishing between a vehicle occupant and a cinched child seat in an occupant weight detection system that provides an output signal responsive to weight applied to a vehicle seat, the method comprising the steps of:

computing a variance of the output signal and a running average of said variance;

detecting vehicle movement;

comparing the average variance to a predefined threshold when vehicle movement is detected and the output signal is within a range that could be produced by either a vehicle occupant or a cinched child seat;

determining that a cinched child seat is present if the average variance is below the predefined threshold; and determining that a vehicle occupant is present if the average variance is above the predefined threshold.

2. The method of claim 1, including the steps of:

disabling deployment of a an air bag if it is determined that a cinched child seat is present; and enabling deployment of the air bag is it is determined that a vehicle occupant is present.

3. The method of claim 2, including the steps of:

setting a cinched child seat latch when it is determined that a cinched child seat is present; and inhibiting the step of enabling deployment of the air bag if the cinched child seat latch is set and it is subsequently determined that a vehicle occupant is present.

4. The method of claim 3, including the steps of:

setting an occupant latch when it is determined that an occupant is present; and inhibiting the step of disabling deployment of the air bag if the occupant latch is set and it is subsequently determined that a cinched child seat is present.

5. The method of claim 4, including the step of:

resetting the occupant latch and the cinched child seat latch when vehicle movement is not detected.

6. The method of claim 1, wherein the step of detecting vehicle movement includes the steps of:

measuring a time interval for which the variance is within a predefined range characteristic of vehicle movement; and detecting vehicle movement if the measured interval exceeds a first predefined time interval.

7. The method of claim 6, including the step of:

resetting the measured time interval and detecting a lack of vehicle movement if the variance is less than the predefined range for at least a second predefined time interval which is shorter than said first predefined time interval.

8. A method of distinguishing between a vehicle occupant and a cinched child seat in an occupant weight detection system that provides an output signal responsive to weight applied to a vehicle seat, the method comprising the steps of:

computing an average variance of the output signal;

computing a frequency of the output signal;

detecting vehicle movement;

when vehicle movement is detected and the output signal is within a range that could be produced by either a vehicle occupant or a cinched child seat:

determining that a cinched child scat is present if the frequency is above a predefined frequency threshold and the average variance is below a predefined variance threshold; and determining that a vehicle occupant is present if the frequency is below the predefined frequency threshold and the average variance is above the predefined variance threshold.

9. The method of claim 8, including the steps of:

measuring an interval for which vehicle movement is detected and the output signal is within a range that could be produced by either a vehicle occupant or a cinched child seat; and determining that a cinched child seat is present if the frequency is above the predefined frequency threshold and the measured interval is longer than a predetermined interval.

10. The method of claim 8, including the steps of:

measuring an interval for which vehicle movement is detected and the output signal is within a range that could be produced by either a vehicle occupant or a cinched child seat; and determining that a vehicle occupant is present if the frequency is below the predefined frequency threshold and the measured interval is longer than a predetermined interval.

11. A method of distinguishing between a vehicle occupant and a cinched child seat in an occupant weight detection system that provides an output signal responsive to weight applied to a vehicle seat, the method comprising the steps of:

computing an average variance of the output signal;

detecting vehicle movement;

measuring an interval for which vehicle movement is detected and the output signal is within a range that could be produced by either a vehicle occupant or a cinched child seat;

comparing the average variance to a predefined threshold when the measured interval exceeds a predefined interval;

determining that a cinched child seat is present if the average variance is below the predefined threshold; and determining that a vehicle occupant is present if the average variance is above the predefined threshold.

12. A method of distinguishing between a vehicle occupant and a cinched child seat in an occupant weight detection system that provides an output signal responsive to weight applied to a vehicle seat, the method comprising the steps of:

computing an average variance of the output signal;

computing a frequency of the output signal;

detecting vehicle movement;

measuring an interval for which vehicle movement is detected and the output signal is within a range that could be produced by either a vehicle occupant or a cinched child seat;

when the measured interval exceeds a first predefined interval:

determining that a cinched child seat is present if the frequency is above a predefined frequency threshold and the average variance is below a predefined variance threshold; and determining that a vehicle occupant is present if the frequency is below the predefined frequency threshold and the average variance is above the predefined variance threshold.

13. The method of claim 12, including the step of:

determining that a cinched child seat is present if the frequency is above the predefined frequency threshold and the measured interval is longer than a second predefined interval which is longer than said first predefined interval.

14. The method of claim 12, including the step of:

determining that a vehicle occupant is present if the frequency is below the predefined frequency threshold and the measured interval is longer than a second predefined interval which is longer than said first predefined interval.

* * * * *